(12) United States Patent
Watkins, Jr. et al.

(10) Patent No.: US 8,903,132 B2
(45) Date of Patent: Dec. 2, 2014

(54) EFFICIENT SYSTEM AND METHOD FOR BODY PART DETECTION AND TRACKING

(75) Inventors: Oliver ("Lake") Watkins, Jr., Toronto (CA); Yousuf Chowdhary, Jr., Maple (CA); Jeffrey Brunet, Richmond Hill (CA); Ravinder ("Ray") Sharma, Toronto (CA); Ling Guan, Toronto (CA); Yun Tie, Mississauga (CA); Rui Zhang, Qingdao (CN)

(73) Assignee: 2343127 Ontario Inc., Toronto, Ontario (CA)

( * ) Notice: Subject to any disclaimer, the term of this patent is extended or adjusted under 35 U.S.C. 154(b) by 165 days.

(21) Appl. No.: 13/610,225

(22) Filed: Sep. 11, 2012

(65) Prior Publication Data

US 2013/0064426 A1 Mar. 14, 2013

Related U.S. Application Data

(60) Provisional application No. 61/573,670, filed on Sep. 12, 2011.

(51) Int. Cl.
*G06K 9/00* (2006.01)
(52) U.S. Cl.
CPC ........ *G06K 9/00362* (2013.01); *G06K 9/00261* (2013.01)

USPC .......................................... 382/103; 382/165
(58) Field of Classification Search
USPC .................. 382/100, 103, 104, 118, 162, 165
See application file for complete search history.

(56) References Cited

U.S. PATENT DOCUMENTS

| | | | |
|---|---|---|---|
| 2003/0103652 A1* | 6/2003 | Lee et al. | 382/118 |
| 2005/0074167 A1* | 4/2005 | Maeda et al. | 382/190 |
| 2009/0074260 A1* | 3/2009 | Kobayashi | 382/118 |
| 2010/0027876 A1* | 2/2010 | Avidan et al. | 382/162 |

* cited by examiner

*Primary Examiner* — Andrew W Johns

(57) ABSTRACT

A method is provided for detecting a body part in a video stream from a mobile device. A video stream of a human subject is received from a camera connected to the mobile device. The video stream has frames. A first frame of the video stream is identified for processing. This first frame is then partitioned into observation windows, each observation window having pixels. In each observation window, non-skin-toned pixels are eliminated; and the remaining pixels are compared to determine a degree of entropy of the pixels in the observation window. In any observation window having a degree of entropy above a predetermined threshold, a bounded area is made around the region of high entropy pixels. The consistency of the entropy is analyzed in the bounded area. If the bounded area has inconsistently high entropy, a body part is determined to be detected at that bounded area.

28 Claims, 4 Drawing Sheets

EFFICIENT SYSTEM AND METHOD FOR BODY PART DETECTION AND TRACKING

CROSS REFERENCE TO RELATED APPLICATION

This application claims priority from U.S. Provisional Application No. 61/573,670 filed on Sep. 12, 2011, which is incorporated by reference in its entirety herein.

FIELD OF INVENTION

The present invention is related to object detection and tracking in general and body part recognition and tracking in particular.

BACKGROUND OF THE INVENTION

Numerous face and body part detection methods have been proposed in prior art, including the use of face template matching, deformable template matching or neural network classification. Some prior art body part detection and tracking depend on an analysis involving a comparison between the possible face or body part and some pre-derived data indicative of the presence of either a face or a body part.

Such methods may not be able to distinguish an image region which, while possibly looking nothing like a face or a body part, may possess certain image attributes that may enable it to pass the comparison test. Such a region may then be assigned a high probability of containing a face or a body part and can lead to a false-positive. It is a constant aim in this technical field to improve the reliability of face detection, including reducing the occurrence of false-positive candidates.

Additionally, the processing required to recognize and track a body part tends to be resource intensive, consuming significant amounts of CPU cycles and draining the battery on a mobile/portable device.

It would be desirable to address at least some of these limitations of the prior art by providing an efficient method and a system for body part detection and tracking that could be used for example on mobile devices.

SUMMARY OF THE INVENTION

This application describes an efficient system and method for body part detection and tracking whereby the system using the output data stream from a video capture device increases the efficiency of recognition by reactive detection scheduling and false positive trivial rejection. The system and method eliminates false positives by analyzing the entropy of the potential candidates and eliminating the candidates exhibiting low entropy, while retaining those with high entropy. Additionally, the system and method reactively varies the rate of frame processing depending on changing conditions, such as an increase in the rate of movement of the video capture device or the subject. Thus, if the video capture device or the subject is moving slowly or both are relatively still, a smaller time slice is required of the total processing cycles of the device where the video capture device is embedded. The rate of relative motion can be calculated by analyzing the outputs of the accelerometer and the gyroscope which are also embedded in the device. If the device (phone) is still and the subject is moving fast, the sudden change in entropy is used to detect the movement of the subject. This synergizes with the technique for trivial rejection of false positives, because a larger time slice will be used for body part recognition when the entropy of all candidates is high. Overall, these techniques will have the effect of improving the efficiency of body part detection and tracking on mobile devices.

This provides for a more efficient method of body part detection and tracking, one that tends to adjust the processing required depending on the conditions and applies a concept of entropy. Entropy takes into account the fact that human skin has a high degree of color irregularity and "randomness" or inconsistency. It does not exhibit pattern-like regularity, unlike a busy wallpaper. The present method focuses most on areas of high (and inconsistent) entropy to make the processing very targeted and focused.

According to a first aspect of the invention, a method is provided for detecting a body part in a video stream from a mobile device. A video stream of a human subject is received from a camera connected to the mobile device. The video stream has frames. A first frame of the video stream is identified for processing. This first frame is then partitioned into observation windows, each observation window having pixels. In each observation window, non-skin-toned pixels are eliminated, and the remaining pixels are compared to determine a degree of entropy of the pixels in the observation window. In any observation window having a degree of entropy above a predetermined threshold, a bounded area is made around the region of high entropy pixels. The consistency of the entropy is analyzed in the bounded area. If the bounded area has inconsistently high entropy, a body part is determined to be detected at that bounded area. In one embodiment, the body part is a face.

Once the body part is detected, further processing may allow it to be tracked across frames in the video stream. A second frame in the video stream is identified for processing. Then, any movement of the body part between the first frame and the second frame can be tracked by determining if the bounded area continues to exhibit the same degree of entropy between the first frame and the second frame. If not, the other observation windows in the second frame can be scanned (by doing the skin-tone and entropy analysis steps described above) to re-detect the body part. Preferably, the other observation windows are only re-scanned if a change in entropy is detected in the bounded area.

The other observation windows may be scanned beginning with the observation windows adjacent to the observation window containing the body part in the first frame. The other observation windows may be scanned by moving step-wise outward until the body part is re-detected.

The second frame may be identified for processing at a pre-set time interval, or based on a triggering event such as when a threshold of movement or acceleration of the mobile device is detected (i.e. greater than trivial amount of movement or acceleration—such as from shaky hands). The movement or acceleration may be detected from an on-board gyroscope or accelerometer.

The second frame may be identified for processing sooner if the mobile device is detected to be moving at a higher speed. The speed is preferably based on rate of relative movement between mobile device and subject.

The making of a bounded area may include using a morphological operation to isolate an area within the observation window which has contrasting entropy with its surroundings. Spatial partitioning may be used to focus in on areas of high entropy and rule out areas of low entropy within an observation window.

The skin-tone analysis may include comparing the tone of the pixel to tones in a skin-tone database. Such a skin-tone database may be stored on the mobile device, or it may be stored remotely and queried by the mobile device. A pixel not matching any tones in the skin-tone database may be converted to black (to facilitate further processing by effectively "eliminating" that pixel). A pixel that matches a tone in the skin-tone database may be (likewise) converted to a greyscale tone or white.

Preferably, the degree of entropy considers statistically significant variations in color hue, saturation or value from an average taken across the observation window.

In one embodiment, the video stream is received from an on-board camera (or other video capturing device). The video stream may be received into data storage. The data storage may be provided by one or a combination of: a local fixed memory, a local removable memory, a remote fixed memory, a remote removable memory, and a virtual memory. For example, the data storage may be selected from the group consisting of: a local data storage of a game console, a local inbuilt memory, a user provided memory, an online server, and a shared folder on a network. In one embodiment, the method may be carried out entirely on the mobile device.

The method may further include showing the detected body part on a display on the mobile device. For example, the detected body part may be shown within a game interface, or an ecommerce interface. In one embodiment, the appearance of the detected body part may be shown in a modified or enhanced form on the display.

According to a second aspect of the invention, a mobile device is provided in connection with a camera. The device is programmed for receiving a video stream of a human subject from the camera. The video stream has frames. The first frame of the video stream is identified for processing. The first frame is then partitioned into observation windows, such that each observation window has pixels. In each observation window, non-skin-toned pixels are eliminated and the remaining pixels are compared to determine a degree of entropy of the pixels in the observation window. In any observation window having a degree of entropy above a predetermined threshold, a bounded area is made around the region of high entropy pixels. The consistency of the entropy in the bounded area is analyzed. If the bounded area has an inconsistently high entropy, a body part is determined to be detected at the bounded area.

DETAILED DESCRIPTION

Figure 1:
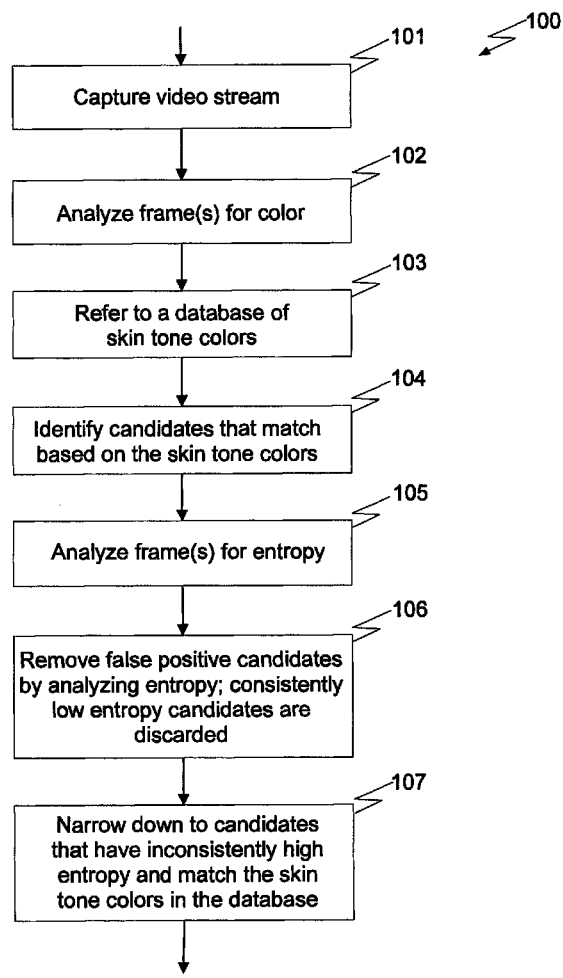
FIG. 1 is a flow diagram showing the main steps in the method for eliminating false positives by color.

Methods and arrangements for efficient body part detection and tracking are disclosed in this application.

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Further, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A "virtual world" as used herein need not be a "game" in the traditional sense of a competition in which a winner and/or loser is determined, but rather that the term "game" incorporates the idea of a virtual world. Moreover, a person or entity who enters the virtual world in order to conduct business, tour the virtual world, or simply interact with others or the virtual environment, with or without competing against another person or entity is still considered to be "playing a game" or engaging in the gameplay of the game.

Virtual worlds can exist on game consoles for example Microsoft Xbox, and Sony Playstation, Nintendo Wii, etc., or on online servers, or on mobile devices (e.g. an iPhone or an iPad), Smartphones, portable game consoles like the Nintendo 3DS, or on a PC (personal computer) running MS Windows, or MacOS, Linux, Google Android or another operating system. This list is not exhaustive but is exemplary of devices or computing environments where virtual worlds can exist, many other variations are available and known to the ones skilled in the art.

A computer or a game console that enables a user to engage with a virtual world, including a memory for storing a control program and data, and a processor (CPU) for executing the control program and for managing the data, which includes user data resident in the memory including a set of gameplay statistics. The computer, or a game console, may be coupled to a video display such as a television, monitor, or other type of visual display while other devices may have it incorporated in them (iPad). A game or other simulations may be stored on a storage media such as a DVD, a CD, flash memory, USB memory or other type of memory media. The storage media can be inserted to the console where it is read. The console can then read program instructions stored on the storage media and present a game interface to the user.

Mobile devices including connected and unconnected devices are becoming the primary devices for playing games and keeping in touch. Such devices tend to be small, have limited processing and storage capacity and are usually powered by a re-chargable battery. Thus an application that tends to consume a lot of processing power like body part detection and tracking results in the slowing down of other running applications and can drain the battery of such a mobile device quite rapidly.

Although the main examples used in this application use a mobile device as an example, it is clear that the invention can also be used with significant advantages on other computing devices e.g. a computer that may be connected to one or more cameras and where the processing cycles conserved as a result of the implementation of the invention may result in the ability to achieve a more efficient method.

FIG. 1 shows the main steps in the method for eliminating false positives by color (skin-tone).

The video stream is first captured 101. This may be achieved by capturing the video stream of a camera that may be built into a mobile device e.g. an iPhone. The video capture may also be done from an external camera or other such device coupled to the computing device e.g. a personal computer connected to one or more cameras or a server controlling several cameras in a security operation.

Next, the system analyzes the video frames for color 102. Analysis for color here implies analyzing the individual pixels or groups of pixels for certain colors.

The system refers to a database of skin tone colors 103. The database may be composed of known skin tone colors of humans and may be adaptive such that it can learn over time or a manual method may be used to add to this database to increase its scope.

The system next identifies candidates that match based on the skin tone colors 104, by first transforming all pixels in the whole region that matches the range of colors defined by the database into white, and all other pixels to black. It is also possible to apply morphological operations to isolate and identity candidate regions. These candidate regions can then be used in other steps, such as being analyzed for entropy.

The video frames are then analyzed for entropy 105. Analysis for entropy here implies analyzing an observation window (group of pixels) for statistically significant variations in color hue, saturation, and value. Subwindows which are more than a few standard deviations from the average color of the whole observation window are said to be 'rough' or 'intense' areas. Thus, smooth surfaces have low entropy while rough surfaces like human skin or face have a relatively higher entropy.

Entropy is a measure of disorder, or more precisely unpredictability. Entropy is an expression of disorder or randomness. (There are two related definitions of entropy: the thermodynamic definition and the statistical mechanics definition. Thermodynamic entropy has the dimension of energy divided by temperature, and a unit of joules per kelvin (J/K) in the International System of Units.)

In the present case, the entropy of a possible candidate can be determined by analyzing observation windows. These windows can also be broken down into smaller regions to consider possible candidate areas. Candidate areas may be made into a bounded area for further analysis.

Once the entropy of all possible candidates is determined within their respective bounding regions, the entropy of the image (or frame) as a whole can be compared to the entropy exhibited in each of these sub-regions. If the average entropy of the sub-region is higher than the average entropy of the whole image, then the sub-region can be further confirmed as a candidate. If this is not the case, then the region is instead identified as a false positive. Due to the large amounts of potential variation in entropy, this process may be repeated multiple times, where consistently low entropy candidates are discarded.

To remove false positive candidates by analyzing entropy, consistently low entropy candidates are discarded 106.

The system narrows the field down to candidates that have inconsistently high entropy and match skin tone colors in the database 107.

A virtual world that incorporates the invention, either in its entirety or some components of it, may be a single player game or a multiplayer game or a MMORPG (Massively Multiplayer Online Role Playing Game) and may exist on any type of a gaming device which provides a either a video capture sensor (camera) and sensors like accelerometer and gyroscope built in it, and may include but not limited to an iPhone, iPad, Smartphones, Android phones, personal computers e.g. laptops, tablet computers, touchscreen computers, gaming consoles and online server based games.

The computer program comprises: a computer usable medium having computer usable program code, the computer usable program code comprises: computer usable program code for presenting graphically to the player the different options available to engage in gameplay via the touchscreen interface.

The term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

Several implementation possibilities exist. Some obvious ones are listed below, but there may be other methods obvious to the ones skilled in the art, and the intent is to cover all such scenarios. The application is not limited to the cited examples, but the intent is to cover all such areas that may be used in a virtual world or other applications.

Sensors

Micro-Electro-Mechanical Systems (MEMS) is the integration of mechanical elements, sensors, actuators, and electronics on a common silicon substrate through microfabrication technology. In essence MEMS are tiny mechanical devices that are built onto semiconductor chips and are measured in micrometers. While the electronics are fabricated using integrated circuit process sequences the micromechanical components are fabricated using compatible "micromachining" processes. Complete systems-on-a-chip MEMS are an enabling technology allowing the development of smart products, augmenting the computational ability of microelectronics with the perception and control capabilities of microsensors and microactuators. Various sensors available on mobile devices are briefly discussed below.

Digital Compass

An electro-magnetic device that detects the magnitude and direction of the earth's magnetic field and point to the earth's magnetic north. Used to determine initial state (players facing each other), and then to determine ground-plane orientation during play.

Accelerometer

Used for corroborating the compass when possible, and for determining the up-down plane orientation during play. In an AR game compass and accelerometer provide directionality.

Gyroscope

A gyroscope is a device for measuring or maintaining orientation, based on the principles of conservation of angular momentum. Gyroscopes can be mechanical or based on other operating principles, such as the electronic, microchip-packaged MEMS gyroscope devices found in consumer electronic devices. Gyroscopes include navigation when magnetic compasses do not work, or for the stabilization, or to maintain direction.

Some or all of the above listed embedded sensors in a mobile device may be used in the present methods and systems.

Figure 2:
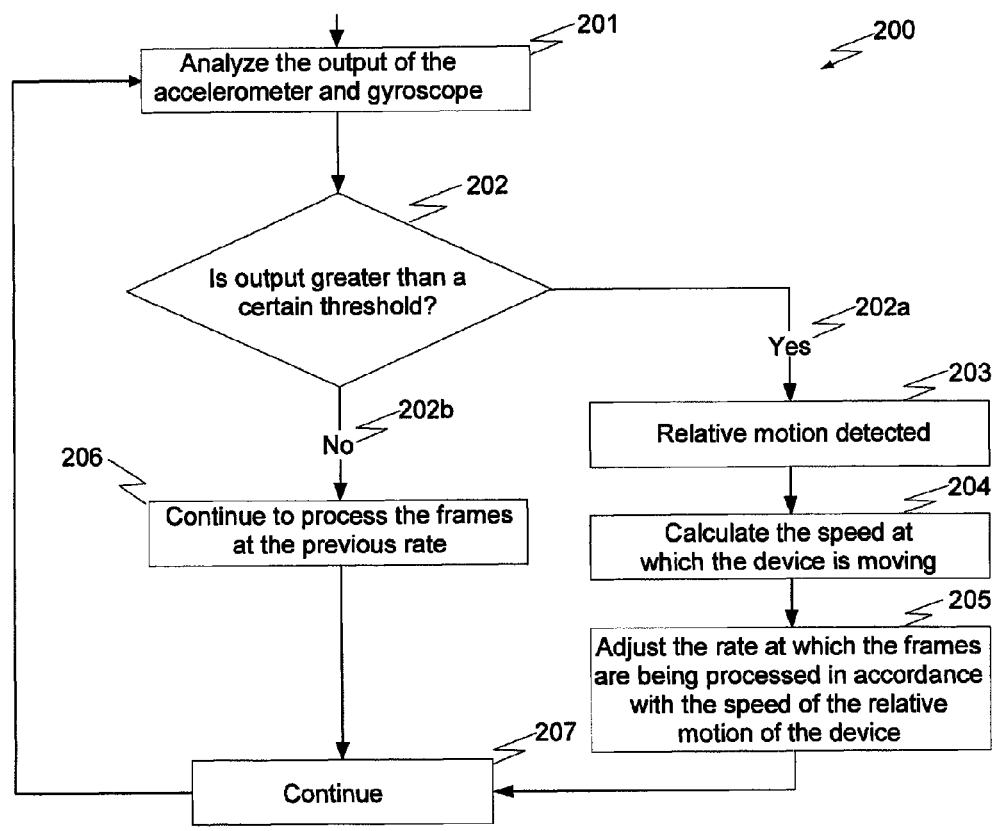
FIG. 2 is a flow diagram showing the main steps in the method for determining frame processing rate.

In one embodiment of the invention the system use these embedded sensors (e.g. accelerometer and gyroscope) to trigger frame analysis. Exemplary process steps are illustrated in FIG. 2.

The method starts by analyzing the output of the accelerometer and gyroscope 201.

The system considers whether this output of the embedded sensors is greater than a certain threshold 202. A definable threshold may be useful to define in order to differentiate between intended motions caused by the user from those that may be un-intended and caused by the normal movement of the user (for example, shaky hands). Thresholds may be dependent on the operating context. Operating context refers to internal and/or external factors impacting a particular system, device, application, business, organization etc. For example, operating context for an application is the external environment that influences its operation. For a mobile application, the operating context may be defined by the hardware and software environment in the device, the target user, and other constraints imposed by various other stakeholders.

If the outputs of the embedded accelerometer and gyroscope are greater than a certain threshold (Yes 202a), then relative motion is detected 203. As mentioned earlier, sensors embedded in the mobile device like the gyroscope and the accelerometer measure the acceleration and deceleration of the device, informing the system when the user starts and stops the motion. When the system detects that a motion has started, it can then continue to track changes in the phi, theta, or r coordinates of the device's polar position for changes until it detects that the motion has stopped. The system calculates a net change with respect to the initial stationery position in the value of the coordinates, and if it detects any appreciable changes in the coordinates then the system can conclude that there is relative motion between the device and the subject.

The system calculates the speed at which the gaming device is moving 204 and adjusts the rate at which the frames are being processed in accordance with the speed of the relative motion of the gaming device 205. That is, if the device is moving relatively slower than before, the system decreases the rate at which the frames are being processed. Conversely, if the device is moving relatively faster than before, the system increases the rate at which the frames are being processed. This loop can be continued 207.

If the outputs of the embedded sensors are lower than a certain threshold 202b, the system continues to process the frames at the previous rate 206. That is if the device is relatively still or moving at a speed that is relatively constant, the system continues to process the frames at the previous rate. This loop can be continued 207.

Thus adjusting the rate at which the frames are being processed can make the process more efficient, and as a result, free up the computing resources of the device so that it can make these resources available to other components within the same application or to other running applications and processes.

Figure 3:
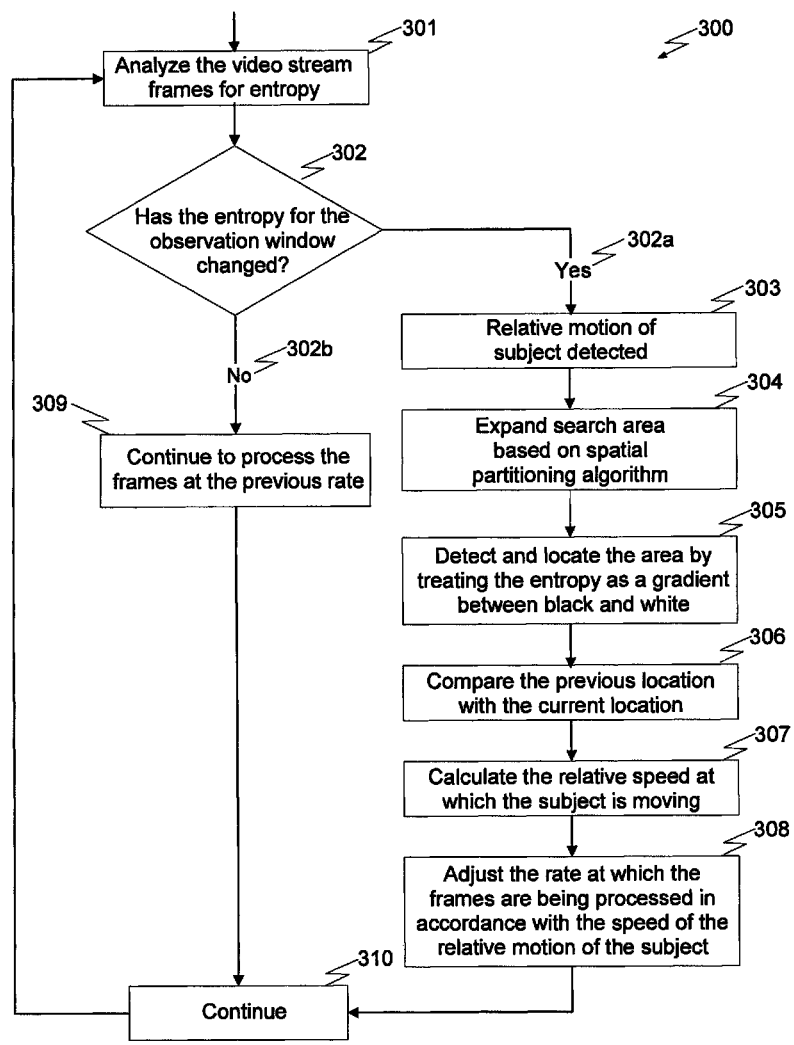
FIG. 3 is a flow diagram showing the main steps in the method for entropy change analysis.

FIG. 3 illustrates entropy change analysis (used in tracking a body part once detected).

The system first analyzes the video stream frames for entropy 301.

The system considers whether the entropy of the observation window has changed 302. An observation window is a region selected for analysis at a particular moment in time, where a square region of a given image is inspected for certain properties during a processing pass (the window can be thought of as sliding across the region during the pass, or the frame may be thought of as made up of multiple separate non-overlapping observation windows). It is the data structure of choice when it is either inefficient to inspect the entire region as once (and thus it must be subdivided and each sub-region processed in parallel) or when certain properties are spatially partitioned.

The change in the entropy of the observation window is determined by comparing the current entropy of the observation window with the previous entropy. The comparison determines if the entropy has increased or decreased.

If the entropy of the observation window has changed (Yes 302a), then relative motion of the subject is detected 303.

The system can then expand the search area based on spatial partitioning algorithm 304. Space partitioning is the process of dividing a space into two or more disjoint subsets (non-overlapping). Thus, space partitioning divides a space into non-overlapping regions, and any point in the space can then be identified to lie in exactly one of these regions. Space-partitioning systems are usually hierarchical in nature, i.e. a space (or a region of space) is divided into several regions, and then the same space-partitioning system is recursively applied to each of the regions thus created. The resulting regions may be organized into a tree, called a space-partitioning tree. Which makes it more efficient to perform certain kinds of geometry queries for example, determining whether two objects are close to each other in collision detection, or determining whether a ray intersects an object in ray tracing. Space partitioning is also used in computer graphics for organizing objects in a virtual scene.

The system detects and locates the area by treating the entropy as a gradient between black and white, creating a gray-scale image of entropy. Morphological operations can then be used to isolate areas with contrasting entropy. The area with the highest average entropy of comparable size to the previous candidate is isolated and bounded to generate a current candidate. The system then calculates the previous candidate's location and the current candidate's location (by local origin) 305.

The previous location is compared with the current location 306. The relative speed at which the subject is moving is calculated 307, and the rate at which the frames are being processed in accordance is adjusted with the relative speed of the subject and the gaming device 308. That is, if the subject is moving relatively slower than before, the system automatically decreases the rate at which the frames are being processed. Conversely, if the subject is moving relatively faster than before, the system automatically increases the rate at which the frames are being processed. This loop can be continued 310.

If the entropy of the observation window has not changed (No 302b), this implies that the device and the subject are relatively still and no relative motion is detected. Therefore, the system continues to process the frames at the previous rate 309. That is, if the subject is relatively still or moving at a speed that is relatively constant (i.e. same as before), the system continues to process the frames at the previous rate. This loop can be continued 310.

Figure 4:
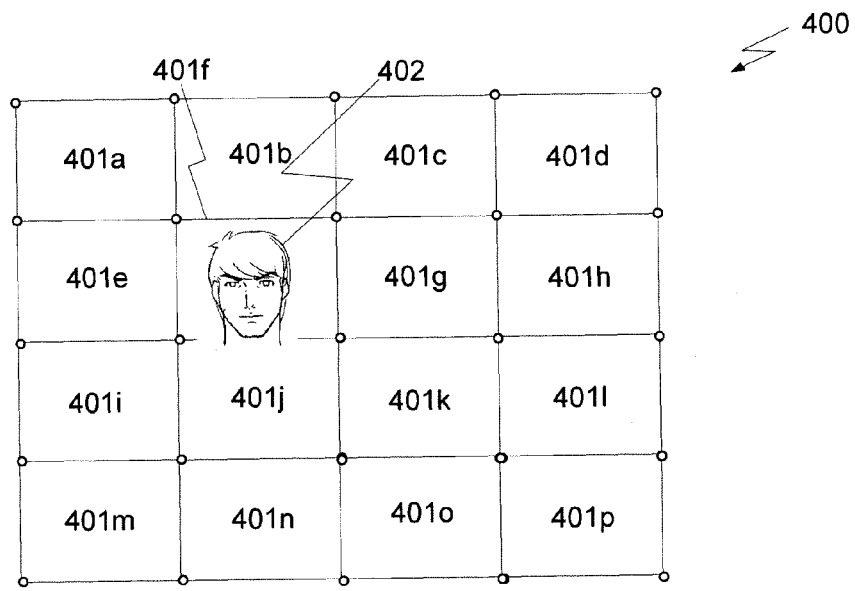
FIGS. 4 and 5 are diagrams illustrating the use of observation windows to isolate areas for evaluation.
Figure 5:
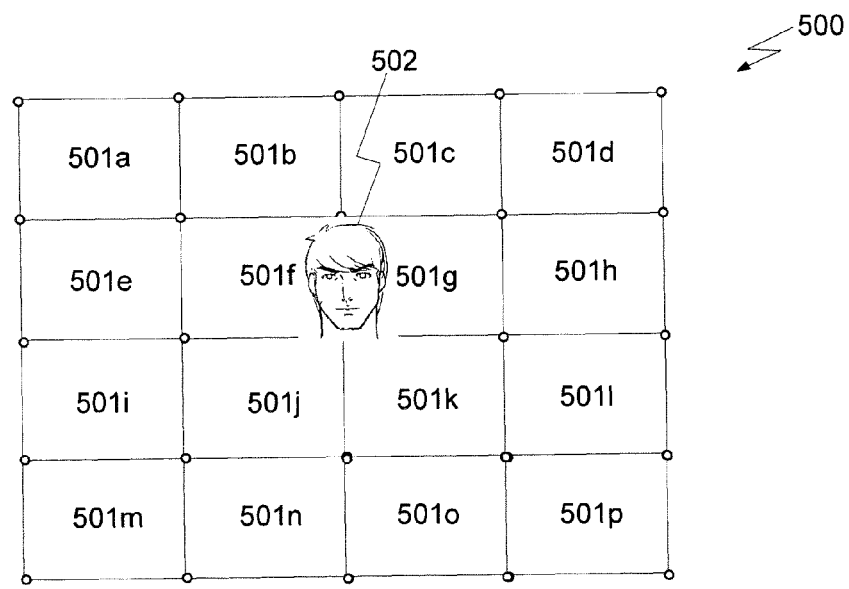

FIG. 4 is a sample frame 400 from a video stream which has been partitioned into observation windows (401a-401p). These can be processed (for skin-tone matching and high/low entropy) in series, or (more preferably) in parallel. Here, the system would detect an area of higher entropy and matching skin-tones in window 401f. A bounded area may be made around the face/head region 402. The system can then focus exclusively on this detected body part area until a change occurs (e.g. movement of the device or detected change in entropy at 402 or 401f). The system would then begin re-scanning some observation windows (especially those adjacent to or nearby the window where the body part had previously been detected). Here, as shown in FIG. 5, within the frame 500 the system re-detects the face/head 502 in between two adjacent observation windows 501f, 501g.

This is merely a simple example to illustrate the use of observation windows in monitoring the movement of a body part. In an actual video stream sample, the background would typically contain many more candidate areas that would need to be weeded out (by skin-tone analysis and degree of entropy) in order to initially isolate the head/face region in 402. However, as shown in FIGS. 4-5, once false candidates have been weeded out, the system can focus its processing energies on tracking the detected body part (across adjacent or nearby windows), and for the most part, ignore portions of the frame that are unlikely to contain the body part, so that the initial elimination steps do not need to be repeated. The most intensive entropy processing can also be focused on the identified regions, rather than the whole frame.

In one embodiment of the invention, a non-gaming application may also use the system and method disclosed in this application. For example an application for a mobile device like an iPhone or other similar device where a user may be performing some physical action, such as a demonstration or virtual performance where digital media may be intermixed with the presentation. The said mobile device may connect to a backend server using a network e.g. WiFi or wireless network of a service provider etc.

In another embodiment of the invention, the gaming device and the virtual world that may exist on it may incorporate the system and method of the invention. In one such embodiment when a body part is detected, it may be replaced by a virtual object. For example, on detecting the face the application replaces it with the face of a monster or an alien. Thus continuously detecting the face/head and substituting it with the virtual object accurately may become a fundamental part of the application.

In an exemplary Augmented Reality game using the disclosed invention, a player may battle opponents such that a given body part is substituted with a virtual object. For example, a player's arm might be substituted with a prehensile tentacle which can be used to lash opponents like a whip. Or an opponent's face might be substituted with that of a spitting lizard such that projectiles shoot out of the mouth of the opponent each time they open their mouth and the player is required to shoot down these projectiles.

As the above examples illustrate, the Augmented Reality gaming enabled by the disclosed invention allows for a merging of the physical and virtual worlds. This has implications for how users interact with the virtual world generally, and the representation of a player's abilities in discrete statistics specifically. For example, the statistics "Attack" and "Defense" are commonly used to determine whether a virtual character hits or misses another virtual object during an attack. The chance of success is usually calculated by dividing Attack by Defense (or some variation involving other stats). In the case of Augmented Reality gaming enabled by the disclosed invention, these statistics may not be strictly necessary, since a player can move his or her own body to determine whether they "hit" or "miss" a virtual object. Rather than a declarative abstraction of what a player's avatar is capable of, statistics would instead be inferred concrete traits of the player, allowing for a physically meaningful level of interaction.

In another exemplary game a player may be expected to scan or take a photo of something and replace the intended body part with the scanned image. For example, on Halloween a child might shop for costumes by taking a photo of each mask and overlaying the image over their own face. Games of hide and seek might take on another meaning when the present invention is used to hide one's self in a half-real, half-digital forest. Thanks to the detection and tracking of body parts, exposed skin in such a game would benefit from active camouflage.

One embodiment of the invention may preferably also provide a framework or an API (Application Programming Interface) for virtual world creation that allows a developer to incorporate the functionality of body part detection and tracking. Using such a framework or API allows for a more uniform virtual world generation, and eventually allows for more complex and extensive ability to interact with the virtual world and its objects.

It should be understood that although the term game has been used as an example in this application but in essence the term may also imply any other piece of software code where the embodiments of the invention are incorporated. The software application can be implemented in a standalone configuration or in combination with other software programs and is not limited to any particular operating system or programming paradigm described here. For the sake of simplicity, we singled out game applications for our examples. Similarly we described users of these applications as players. There is no intent to limit the disclosure to game applications or player applications. The terms players and users are considered synonymous and imply the same meaning. Likewise, virtual worlds, games and applications imply the same meaning. Thus, this application intends to cover all applications and user interactions described above and ones obvious to the ones skilled in the art.

Although interacting with virtual objects has been exemplified above with reference to gaming, it should be noted that virtual objects are also associated with many industries and applications. For example, virtual worlds/objects can be used in movies, cartoons, computer simulations, and video simulations, among others. All of these industries and applications would benefit from the disclosed invention.

The examples noted here are for illustrative purposes only and may be extended to other implementation embodiments. While several embodiments are described, there is no intent to limit the disclosure to the embodiment(s) disclosed herein. On the contrary, the intent is to cover all alternatives, modifications, and equivalents obvious to those familiar with the art.

What is claimed is:

1. A method of detecting a body part in a video stream from a mobile device, comprising:
   (a) receiving a video stream of a human subject from a camera connected to the mobile device, the video stream having frames;
   (b) identifying a first frame of the video stream for processing;

(c) partitioning the first frame into observation windows, each observation window having pixels;
(d) in each observation window:
 (i) eliminating non-skin-toned pixels; and
 (ii) comparing the remaining pixels to determine a degree of entropy of the pixels in the observation window;
(e) in any observation window having a degree of entropy above a predetermined threshold, making a bounded area around the region of high entropy pixels; and
(f) analyzing the consistency of the entropy in the bounded area, wherein if the bounded area has an inconsistently high entropy, a body part is determined to be detected at the bounded area.

2. The method of claim 1, wherein the body part is a face.

3. The method of claim 1, further comprising:
(g) identifying a second frame in the video stream for processing; and
(h) tracking movement of the body part between the first frame and the second frame by determining if the bounded area continues to exhibit the same degree of entropy between the first frame and the second frame; and if not, scanning other observation windows in the second frame according to steps (d), (e) and (f) to re-detect the body part.

4. The method of claim 3, wherein the other observation windows are scanned beginning with the observation windows adjacent to the observation window containing the body part in the first frame.

5. The method of claim 4, wherein the other observation windows are scanned by moving step-wise outward until the body part is re-detected.

6. The method of claim 3, wherein the second frame is identified for processing at a pre-set time interval.

7. The method of claim 3, wherein the second frame is identified for processing when a threshold of movement or acceleration of the mobile device is detected.

8. The method of claim 7, wherein the movement or acceleration of the mobile device is detected from an on-board gyroscope or accelerometer.

9. The method of claim 3, wherein the second frame is identified for processing sooner if the mobile device is detected to be moving at a higher speed.

10. The method of claim 9, wherein the speed is based on rate of relative movement between mobile device and subject.

11. The method of claim 3, wherein the other observation windows are only rescanned if a change in entropy is detected in the bounded area.

12. The method of claim 1, wherein making a bounded area in step (e) includes using a morphological operation to isolate an area within the observation window which has contrasting entropy with its surroundings.

13. The method of claim 1, wherein step (d)(i) includes comparing the tone of the pixel to tones in a skin-tone database.

14. The method of claim 13, wherein the skin-tone database is stored on the mobile device.

15. The method of claim 13, wherein the skin-tone database is stored remotely and queried by the mobile device.

16. The method of claim 13, wherein a pixel not matching any tones in the skin-tone database is converted to black.

17. The method of claim 13, wherein a pixel that matches a tone in the skin-tone database is converted to a greyscale tone or white.

18. The method of claim 1, wherein the method is carried out entirely on the mobile device.

19. The method of claim 1, wherein step (e) includes using spatial partitioning to rule out areas of low entropy within an observation window.

20. The method of claim 1, wherein the degree of entropy considers statistically significant variations in color hue, saturation or value from an average taken across the observation window.

21. The method of claim 1, wherein the video stream is received from an on-board camera.

22. The method of claim 1, wherein the video stream is received into data storage.

23. The method of claim 22, wherein the data storage is provided by one or a combination of: a local fixed memory, a local removable memory, a remote fixed memory, a remote removable memory, and a virtual memory.

24. The method of claim 22, wherein the data storage is selected from the group consisting of: a local data storage of a game console, a local inbuilt memory, a user provided memory, an online server, and a shared folder on a network.

25. The method of claim 1, further comprising showing the detected body part on a display on the mobile device.

26. The method of claim 25, wherein the detected body part is shown within a game interface.

27. The method of claim 25, wherein the detected body part is shown within an ecommerce interface.

28. The method of claim 25, wherein the appearance of the detected body part is shown in a modified or enhanced form on the display.

* * * * *